(12) United States Patent
Miyahara et al.

(10) Patent No.: US 11,539,856 B2
(45) Date of Patent: Dec. 27, 2022

(54) IMAGE PROCESSING CAPABLE OF MONOCHROME OUTPUT BY ENHANCING THE DISTINCTIVENESS OF COLOR DOCUMENT

(71) Applicant: KYOCERA Document Solutions Inc., Osaka (JP)

(72) Inventors: Norifumi Miyahara, Torrance, CA (US); Yoshihiro Osada, Torrance, CA (US); Keizen Kanazawa, Torrance, CA (US); Kunihiko Shimamoto, Los Angeles, CA (US); Taku Matsuo, Torrance, CA (US); Kyoko Masuda, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 56 days.

(21) Appl. No.: 17/163,528

(22) Filed: Jan. 31, 2021

(65) Prior Publication Data
US 2022/0247885 A1 Aug. 4, 2022

(51) Int. Cl.
*H04N 1/40* (2006.01)
*H04N 1/00* (2006.01)
*H04N 1/60* (2006.01)

(52) U.S. Cl.
CPC ..... *H04N 1/40012* (2013.01); *H04N 1/00005* (2013.01); *H04N 1/0044* (2013.01); *H04N 1/00074* (2013.01); *H04N 1/00413* (2013.01); *H04N 1/6072* (2013.01)

(58) Field of Classification Search
CPC .......... H04N 1/40012; H04N 1/00005; H04N 1/00074; H04N 1/00413; H04N 1/0044; H04N 1/6072
See application file for complete search history.

(56) References Cited

U.S. PATENT DOCUMENTS

| 2009/0263016 A1* | 10/2009 | Kuo ..................... H04N 1/6027 382/167 |
| 2012/0050828 A1* | 3/2012 | Ohk ..................... H04N 1/6072 358/518 |
| 2012/0062914 A1* | 3/2012 | Iwamoto .................. H04N 1/62 358/1.9 |

\* cited by examiner

*Primary Examiner* — Christopher Wait
(74) *Attorney, Agent, or Firm* — Hawaii Patent Services; Nathaniel K. Fedde; Kenton N. Fedde (57) ABSTRACT

Provided is an image processing apparatus that enhances the distinctiveness of document having a color portion and outputs in monochrome. A monochrome visual determination unit determines whether or not the distinctiveness of the color portion is low when the document data having the color portion is output in monochrome. This color portion includes characters, electronic marks, and graphs, and they are after a specific keyword. A monochrome presentation unit presents to a user a warning or a result of modification when there is the color portion that the distinctiveness is determined to be low by the monochrome visual determination unit. The monochrome presentation unit presents a state in which the document data is output in monochrome by displaying a preview.

20 Claims, 7 Drawing Sheets

BOLD

$USERID String    The user identification
for the current connection. This variable is
the value of the user name specified in the Dial-Up Networking
Connect To dialog box.

$PASSWORD String    The password for the current connection. This variable is the
value of the user name specified in the Dial-Up Networking
Connect To dialog box.

$SUCCESS Boolean    This variable is set by certain commands to indicate
whether or not the command succeeded. A script can make
decisions based upon the value of this variable.

$FAILURE Boolean    This variable is set by certain commands to indicate
whether or not the command failed. A script can make decisions
based upon the value of this variable.

UNDERLINE $USERID    String    The user identification
for the current connection. This variable is
the value of the user name specified in the Dial-Up Networking
Connect To dialog box.

$PASSWORD    String    The password for the current connection. This variable is the
value of the user name specified in the Dial-Up Networking
Connect To dialog box.

$SUCCESS    Boolean    This variable is set by certain commands to indicate
whether or not the command succeeded. A script can make
decisions based upon the value of this variable.

$FAILURE    Boolean    This variable is set by certain commands to indicate
whether or not the command failed. A script can make decisions
based upon the value of this variable.

BACKGROUND COLOR $USERID    String    The user identification
for the current connection. This variable is
the value of the user name specified in the Dial-Up Networking
Connect To dialog box.

$PASSWORD    String    The password for the current connection. This variable is the
value of the user name specified in the Dial-Up Networking
Connect To dialog box.

$SUCCESS    Boolean    This variable is set by certain commands to indicate
whether or not the command succeeded. A script can make
decisions based upon the value of this variable.

$FAILURE    Boolean    This variable is set by certain commands to indicate
whether or not the command failed. A script can make decisions
based upon the value of this variable.

SINGLE COLOR $USERID    String    The user identification
for the current connection. This variable is
the value of the user name specified in the Dial-Up Networking
Connect To dialog box.

$PASSWORD    String    The password for the current connection. This variable is the
value of the user name specified in the Dial-Up Networking
Connect To dialog box.

$SUCCESS    Boolean    This variable is set by certain commands to indicate
whether or not the command succeeded. A script can make
decisions based upon the value of this variable.

$FAILURE    Boolean    This variable is set by certain commands to indicate
whether or not the command failed. A script can make decisions
based upon the value of this variable.

IMAGE PROCESSING CAPABLE OF MONOCHROME OUTPUT BY ENHANCING THE DISTINCTIVENESS OF COLOR DOCUMENT

BACKGROUND

The present disclosure relates to an image processing apparatus, an image forming apparatus, and an image forming method, and more particularly to an image processing apparatus, an image forming apparatus, and an image forming method capable of outputting color document data in monochrome.

There is a typical image forming apparatus such as a multifunction device (MFP) capable of printing a document or an image.

Among such typical image forming apparatus (image processing apparatus), there are those capable of monochrome conversion for printing by color reduction color image to black and white (monochrome) image, or the like. The image processing apparatus has an image acquisition part, an area extraction part, a character color determination part, an emphasis part, a weak tone part, an image generation part, and a transmission part. The image acquisition part acquires a color image. The area extraction part extracts a character area from the acquired image. The character color determination part determines whether the extracted character area is a general color character area or a color character area different from the general character. The emphasis part applies emphasis processing to a character area determined to be a color character different from general characters. The weak tone part performs a weak tone process on a character area determined to be a general color character. The image generation unit generates a color-reduced image in which the number of colors of the color image is reduced. The transmission part transmits the generated color-reduced image to an external apparatus. Since the area of the general color character is larger than the area of the color character different from the general character, the consumption of the developing agent can be reduced by applying the weak tone processing to this area.

SUMMARY

An image processing apparatus according to the present disclosure includes: a monochrome visual determination unit configured to determine whether or not visual distinctiveness of a color portion is low when document data having the color portion is output in monochrome; and a monochrome presentation unit configured to present to a user when there is the color portion that the distinctiveness is determined to be low by the monochrome visual determination unit.

An image forming apparatus according to the present disclosure includes: a monochrome visual determination unit configured to determine whether or not visual distinctiveness of a color portion is low when document data having the color portion is output in monochrome; a monochrome presentation unit configured to present to a user when there is the color portion that the distinctiveness is determined to be low by the monochrome visual determination unit; and an image forming unit configured to output the document data when presented by the monochrome presentation unit and instructed by the user.

An image processing method according to the present disclosure is executed by an image processing apparatus and includes the steps of: determining whether or not visual distinctiveness of a color portion is low when document data having the color portion is output in monochrome; and presenting to a user when there is the color portion that the distinctiveness of the color portion is determined to be low.

BRIEF DESCRIPTION OF THE DRAWINGS

FIG. 7 is a screen example of the multiple previews selecting process as shown in FIG. 3.

EMBODIMENT

[System Configuration of Image Forming Apparatus 1]

Figure 1:
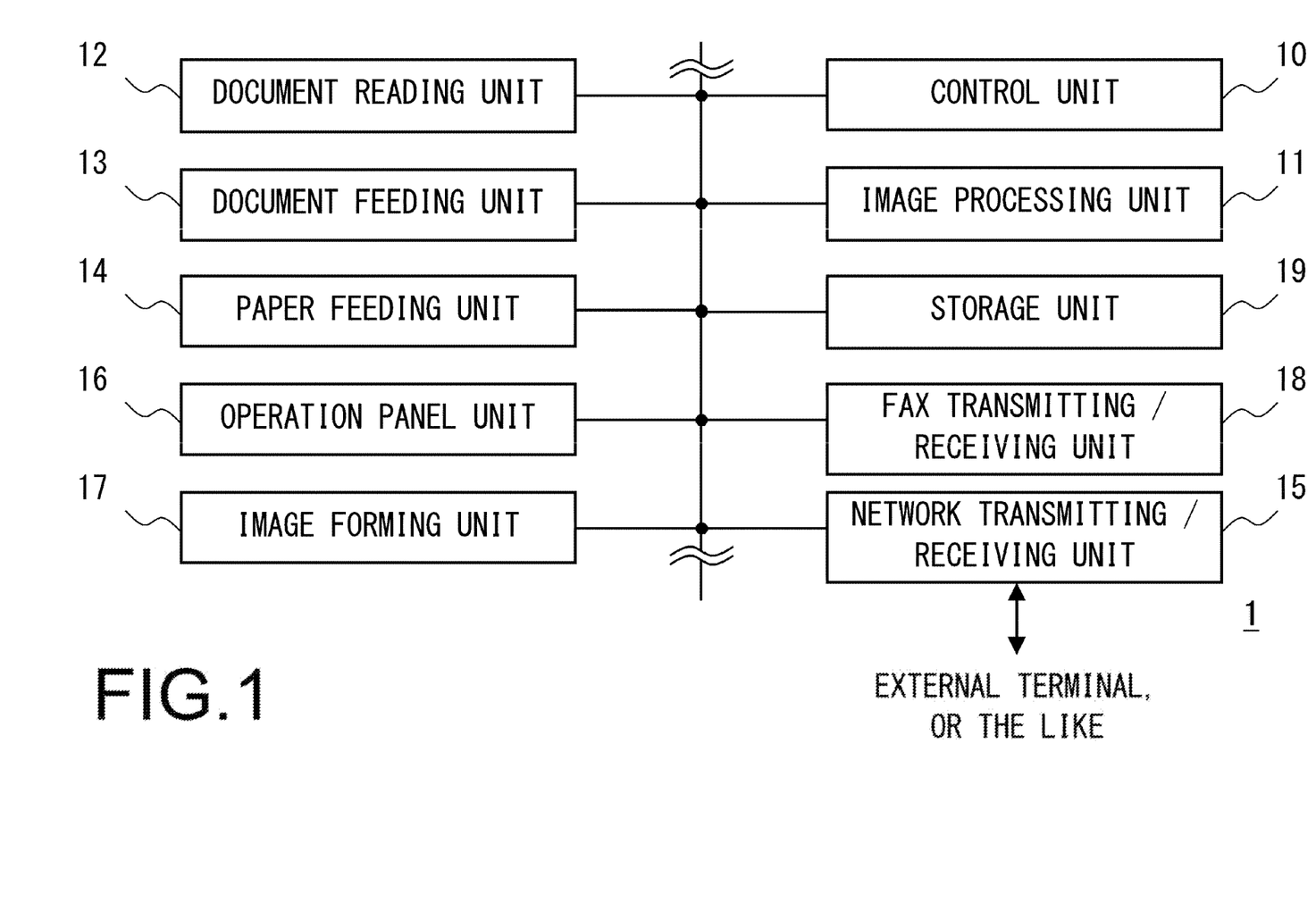
FIG. 1 is a system configuration figure of an image forming apparatus according to an embodiment of the present disclosure.

At first, the system configuration of the image forming apparatus 1, which is an example of the image processing apparatus is described with reference to FIG. 1. The image forming apparatus 1 according to the present embodiment is an example of an image processing apparatus that can convert color document data 200 (FIG. 2) to monochrome and can output it by printing, or the like.

The image forming apparatus 1 includes a control unit 10, an image processing unit 11, a document reading unit 12, a document feeding unit 13, a paper feeding unit 14, a network transmitting/receiving unit 15, an operation panel unit 16, an image forming unit 17, a fax transmitting/receiving unit 18, and a storage unit 19, or the like. Each unit is connected to the control unit 10 and its operation is controlled by the control unit 10.

The control unit 10 is an information processing unit and includes a GPP (General Purpose Processor), a CPU (Central Processing Unit), an MPU (Micro Processing Unit), a DSP (Digital Signal Processor), a GPU (Graphics Processing Unit), and an ASIC (Application Specific Integrated Circuit, a processor for specific applications), or the like. Further, the control unit 10 reads a control program stored in the ROM or HDD of the storage unit 19, expands the control program in the RAM, and executes the control program. As a result, the control unit 10 is operated as each unit of the functional block as described later. The control unit 10 controls the entire apparatus according to instruction information input from an external terminal or the operation panel unit 16.

Figure 2:
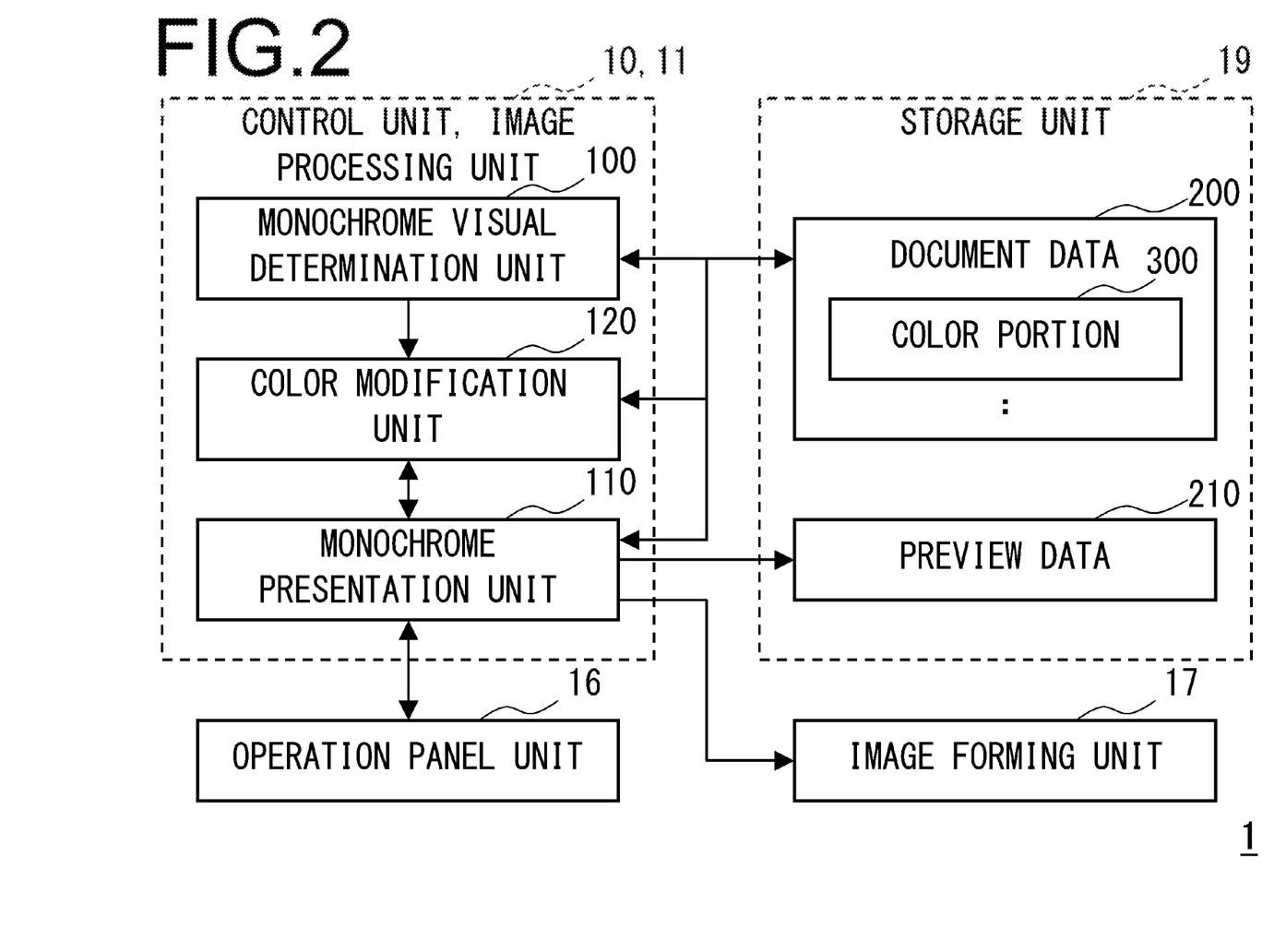
FIG. 2 is a block diagram showing a functional configuration of the image forming apparatus according to the embodiment of the present disclosure.

The image processing unit 11 is a control calculation unit such as a DSP (Digital Signal Processor) or a GPU (Graphics Processing Unit), or the like. The image processing unit 11 performs image processing on the image data. This image processing may be, for example, processing such as scaling, density adjustment, gradation adjustment, and image improvement, or the like. Further, the image processing unit 11 stores the image data read by the document reading unit 12 in the storage unit 19 as document data 200 (FIG. 2). At this time, the image processing unit 11 can also convert the document data 200 into an electronic document such as PDF or an image data file such as TIFF, or the like. Further, the image processing unit 11 may be able to execute at least a part of OCR (Optical Character Recognition) processing. Further, the image processing unit 11 may have a function such as a so-called AI (Artificial Intelligence) accelerator that executes various models such as a convolutional neural network, or the like. Thus, the image processing unit 11 may be able to recognize the image data in the document data 200. In addition, in the present embodiment, the image processing unit 11 can execute a part or any combination of the processing of the functional blocks as described later.

The document reading unit 12 reads the set document. In addition, the document reading unit 12 is arranged above the main body of the image forming apparatus 1. The document reading unit 12 includes a scanner, platen glass, and a document reading slit. When reading a document placed on the platen glass, the document reading unit 12 moves the scanner to a position facing the platen glass and scans the document placed on the platen glass to obtain image data, and then outputs the acquired image data to the control unit 10.

Further, the document reading unit 12 moves the scanner to a position facing the document reading slit when reading the document supplied from the document feeding unit 13. Then, the document reading unit 12 reads the document through the document reading slit in synchronization with the document transport operation by the document feeding unit 13 to acquire image data. The document reading unit 12 outputs the acquired image data to the control unit 10.

The document feeding unit 13 conveys the document read by the document reading unit 12. The document feeding unit 13 is arranged above the document reading unit 12. The document feeding unit 13 includes a document placing unit and a document transporting mechanism. The document feeding unit 13 sequentially feeds the documents placed on the document loading unit to the document reading unit 12 one by one by the document transport mechanism.

The paper feeding unit 14 feeds the recording paper one by one toward the image forming unit 17. The paper feed unit 14 is provided in the main body unit.

The network transmitting/receiving unit 15 is a network connection unit including a LAN board, a wireless transmitter/receiver, and the like for connecting to an external network. The external network of the present embodiment is, for example, a LAN, a wireless LAN, a WAN, a mobile phone network, a voice telephone network, or the like. The network transmitting/receiving unit 15 transmits/receives data on a data communication line, and transmits/receives a voice signal on a voice telephone line. The network transmitting/receiving unit 15 can be connected to an external terminal, a server, or the like, by the data communication line.

The operation panel unit 16 includes an input unit such as a button, a touch panel, or the like, and a display unit such as an LCD (Liquid Crystal Display), an organic EL display, or the like. Further, the operation panel unit 16 is arranged on the front side of the image forming apparatus 1. The buttons on the input unit of the operation panel unit 16 are a numeric keypad, arrow keys, start, cancel, operation mode switching, buttons for giving instructions related to job execution, and the like. The operation mode may include various kinds of modes such as copying, fax transmission, scanner, network scanner, and the like. Also, the job includes printing, sending, saving, recording, or the like, for a selected document. The input unit of the operation panel unit 16 acquires instructions for various jobs of the image forming apparatus 1 by the user. Furthermore, inputting and changing the information of each user according to the user's instruction acquired from the operation panel unit 16 can be performed.

The image forming unit 17 causes an image form on the recording paper from data stored in the storage unit 19, read by the document reading unit 12, or acquired from an external terminal, according to the output instruction of the user. The image forming unit 17 includes a photoconductor drum, an exposure unit, a developing unit, a transfer unit, a fixing unit, and the like. The image forming unit 17 records a toner image on a recording paper by executing an image forming process including charging, exposure, development, transfer, and fixing.

FAX transmitting/receiving unit 18 performs transmission and reception of facsimile. The FAX transmitting/receiving unit 18 can receive a facsimile from another FAX apparatus via a voice line, store the fax in the storage unit 19, and form an image in the image forming unit 17. Further, the FAX transmitting/receiving unit 18 converts the document read by the document reading unit 12 and the document data 200 (FIG. 2) of the network FAX transmitted from the external terminal into image data. The FAX transmitting/receiving unit can facsimile-transmit this image data to another FAX apparatus by a voice line.

The storage unit 19 is a non-transient recording medium such as a semiconductor memory, which is a ROM (Read Only Memory) or a RAM (Random Access Memory), or the like, or an HDD (Hard Disk Drive), or the like. The RAM of the storage unit 19 may keep the stored contents by a function such as self-refresh even in a power-saving state. A control program for controlling the operation of the image forming apparatus 1 is stored in the ROM or HDD of the storage unit 19. In addition, in the storage unit 19, a user account setting is also stored. Further, the storage unit 19 may include an area of a storage folder for each user.

In addition, in the image forming apparatus 1, the control unit 10 and the image processing unit 11 may be integrally-formed such as a GPU built-in CPU, a chip-on module package, an SOC (System On a Chip), or the like. Further, the control unit 10 and the image processing unit 11 may have a built-in RAM, ROM, flash memory, or the like.

[Functional Configuration of Image Forming Apparatus 1]

Next, with reference to FIG. 2, the functional configuration of the image forming apparatus 1 according to the present embodiment is described. Control unit 10 of the image forming apparatus 1 is a monochrome visual determination unit 100, a monochrome presentation unit 110, and a color modification unit 120. The storage unit 19 stores the document data 200 and the preview data 210.

The monochrome visual determination unit 100 determines whether or not the distinctiveness of the color portion 300 is low when the document data 200 having the color portion 300 is output in monochrome. Specifically, the monochrome visual determination unit 100 determines the visual distinctiveness is low, for example, when the color portion 300 is a character, an electronic mark, a graph, or an image, which is difficult to distinguish in monochrome.

Monochrome presentation unit 110, presents to the user when in a case where the monochrome visual determination unit 100 determines that there is a color portion 300, which distinctiveness is low. In the present embodiment, the monochrome presentation unit 110 previews the state in which the document data 200 is output in monochrome. Specifically, the monochrome presentation unit 110 generates review data in a state where the color portion 300 is modified by the color modification unit 120 and displays the preview data. At this time, the monochrome presentation unit 110 can also allow the user to select the type of modification based on the preview display in which a plurality of types of modifications have been made. The monochrome presentation unit 110 acquires the user's selection from the operation panel unit 16, an external terminal, or the like.

The color modification unit 120 modifies the output of the color portion 300 of the document data 200. Specifically, the color modification unit 120 modifies the output method of the object in which the color is specified in the document data 200. In the present embodiment, the color modification unit 120 can modify a plurality of types. The modification includes changing the color designation of the object data in the document data 200, changing or adding metadata, converting the image data of the object, and the like. The plurality of types of modification includes, for example, processing of modification such as emphasis (bold), underline, background color, single color conversion, and enlargement, or the like.

The document data 200 is data of document, or the like, to be output by the image forming apparatus 1. The document data 200 may be, for example, a file such as PDL (Page Description Language) or PS (Post Script, registered trademark) transmitted and acquired from an external terminal, or the like. Alternatively, the document data 200 may be a structured document file of XML (Extensible Markup Language) or HTML (HyperText Markup Language). Alternatively, the document data 200 may be electronic book data such as ePUB, a plain text file, or the like. Alternatively, the document data 200 may be a file of various applications such as a word processor, spreadsheet software, and presentation software, or the like, for an external terminal or an image forming apparatus 1. Alternatively, the document data 200 may be image data including a bitmap image, or compressed image data such as JPEG, TIFF, PNG, or JBIG, or the like. Alternatively, the document data 200 may be an image data of a document placed on a document placing unit and read by a document reading unit 12 according to an instruction from the operation panel unit 16.

In this embodiment, the document data 200 includes a color portion 300. The color portion 300 is, for example, an object that color is specified in the document data 200. This object is image data of a character, a bitmap and a vector, and other data of an output part of the page. Alternatively, the color portion 300 may be a color portion in the image data. The color portion 300 may be set with an attribute indicating its type and other metadata.

The preview data 210 is data for displaying a preview when the document data 200 is output by modifying various outputs by the color modification unit 120. The preview data 210 may be, for example, image data having a resolution lower than that of the print data actually formed by the image forming unit 17, or the like. In addition, in the present embodiment, the preview data 210 may be a plurality of image data (groups) corresponding to each of the plurality of types of modification made by the color modification unit 120, or the like.

Here, the control unit 10 and the image processing unit 11 of the image forming apparatus 1 function as the monochrome visual determination unit 100, the monochrome presentation unit 110, and the color modification unit 120 by executing the control program stored in the storage unit 19. In addition, each part of the image forming apparatus 1 described above becomes a hardware resource for executing the image forming method of the present disclosure. In addition, a part or any combination of the above-mentioned functional configurations may be configured in terms of hardware or circuit by IC, programmable logic, FPGA (Field-Programmable Gate Array) or the like.

[Monochrome Conversion Printing Process by Image Forming Apparatus 1]

Next, the monochrome conversion printing process by the image forming apparatus 1 according to the embodiment of the present disclosure is described with reference to FIGS. 3 to 7. In monochrome conversion print processing of the present embodiment, when the document data 200 is output in monochrome, whether or not the document data 200 has a color portion 300 is determined. On this basis, whether or not the visual distinctiveness of the color portion 300 is lowered and becomes difficult to understand is determined. If it is determined that the visual distinctiveness is lowered, presentation to the user is performed. In the monochrome conversion printing process of the present embodiment, mainly, the control unit 10 and the image processing unit 11 cooperate with each unit to execute the program stored in the storage unit 19 by using the hardware resources. Hereinafter, the details of the monochrome conversion printing process are described step by step with reference to the flowchart of FIG. 3.

(Step S100)

Figure 3:
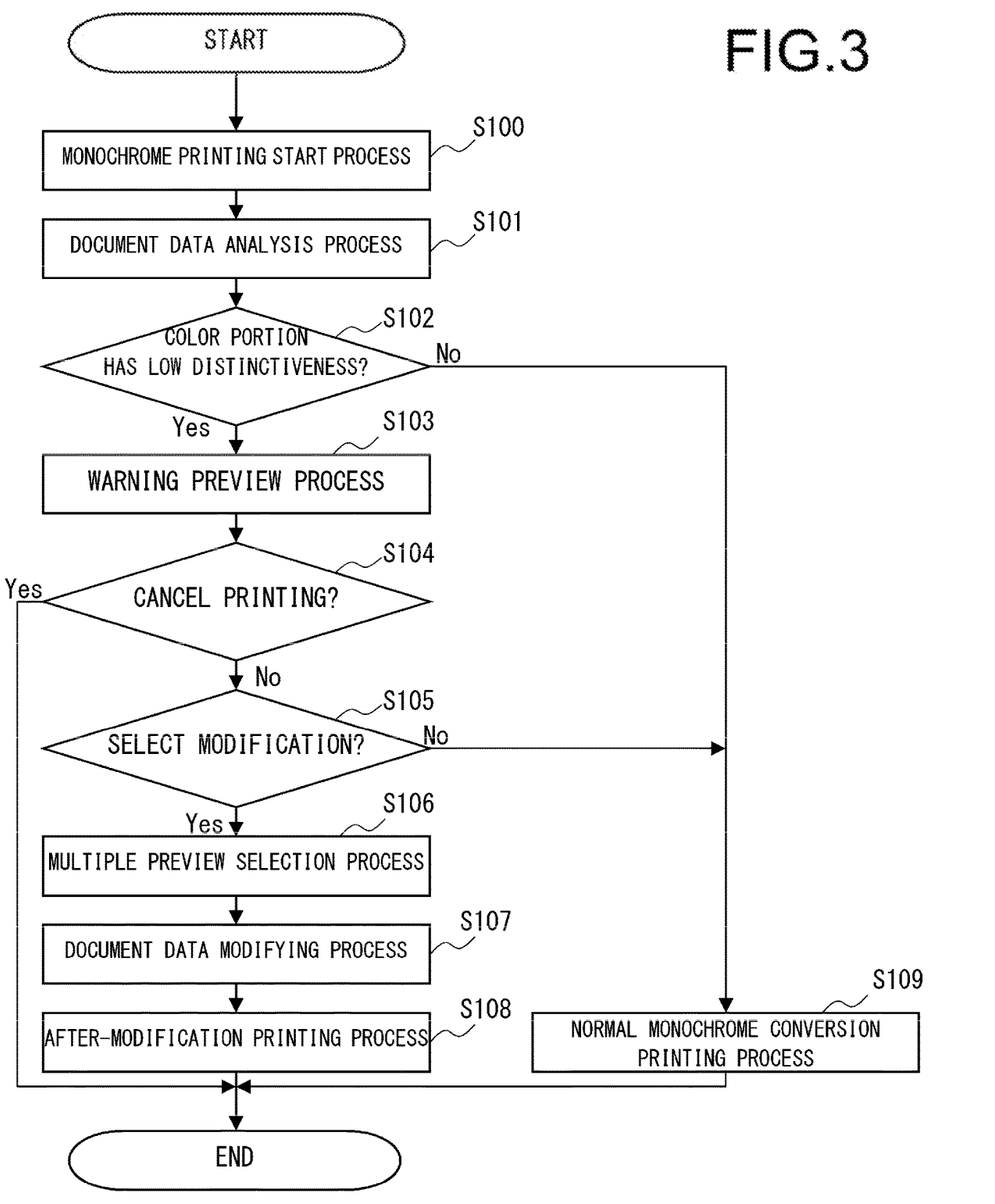
FIG. 3 is a flowchart of the monochrome conversion printing process according to the embodiment of the present disclosure.

First, the monochrome visual determination unit 100 performs a monochrome printing start process. The monochrome visual determination unit 100 acquires an instruction to perform monochrome printing on the document data 200 stored in the storage unit 19. The document data 200 may be obtained from an external terminal, or the like, may be read by the document reading unit 12, or may also be the file saved in the document box. The user may select the document data 200 from the operation panel unit 16 or an external terminal and instruct to perform monochrome printing. Alternatively, monochrome printing may be performed instead of color printing at the time of printing by setting the image forming apparatus 1, or the like.

(Step S101)

Next, the monochrome visual determination unit 100 performs a document data analysis process. The monochrome visual determination unit 100 analyzes the PDL, image data, and the like of the document data 200. Specifically, the monochrome visual determination unit 100 searches for the color portion 300, and when the color portion 300 is searched, determines the visibility of it. In the present embodiment, the monochrome visual determination unit 100 determines, for example, in the case of a PDL, or the like, whether or not a color is specified for each included object. On this basis, the monochrome visual determination unit 100 determines that the object whose color is specified and is drawn with an area equal to or less than the specific area ratio on the page is the color portion 300. This specific area ratio is the ratio of the area of the page to the area of the object to be drawn. In addition, the object includes characters, lines (vectors), image data, and the like. Further, the monochrome visual determination unit 100 determines a part of an electronic mark or a graph. Further, when the document data 200 includes image data, the monochrome visual determination unit 100 determines whether the image data is color image data, whether there are a monochrome portion and a color portion, whether it is a character or a graphic, and the like. Here, the monochrome visual determination unit 100 may perform OCR, or the like, on the character part of the image data and analyze the contents. Further, the monochrome visual determination unit 100 may perform image recognition of the image data and determine a part such as an electronic mark, a graph, a photograph, or the like.

(Step S102)

Next, the monochrome visual determination unit 100 determines whether or not there is a color portion 300, which distinctiveness is low. When the document data 200 having the color portion 300 is output in monochrome, the monochrome visual determination unit 100 determines whether or not the visual distinctiveness of the color portion 300 becomes low. Specifically, the monochrome visual determination unit 100 determines that, if the color object is visually difficult to understand, the distinctiveness of the portion of the object is low.

In the present embodiment, for example, when the color portion 300 is a character, an electronic mark, a graph, or an image, which is difficult to distinguish in monochrome, the monochrome visual determination unit 100 determines that it is difficult to understand visually and the distinctiveness is low.

Figure 4:
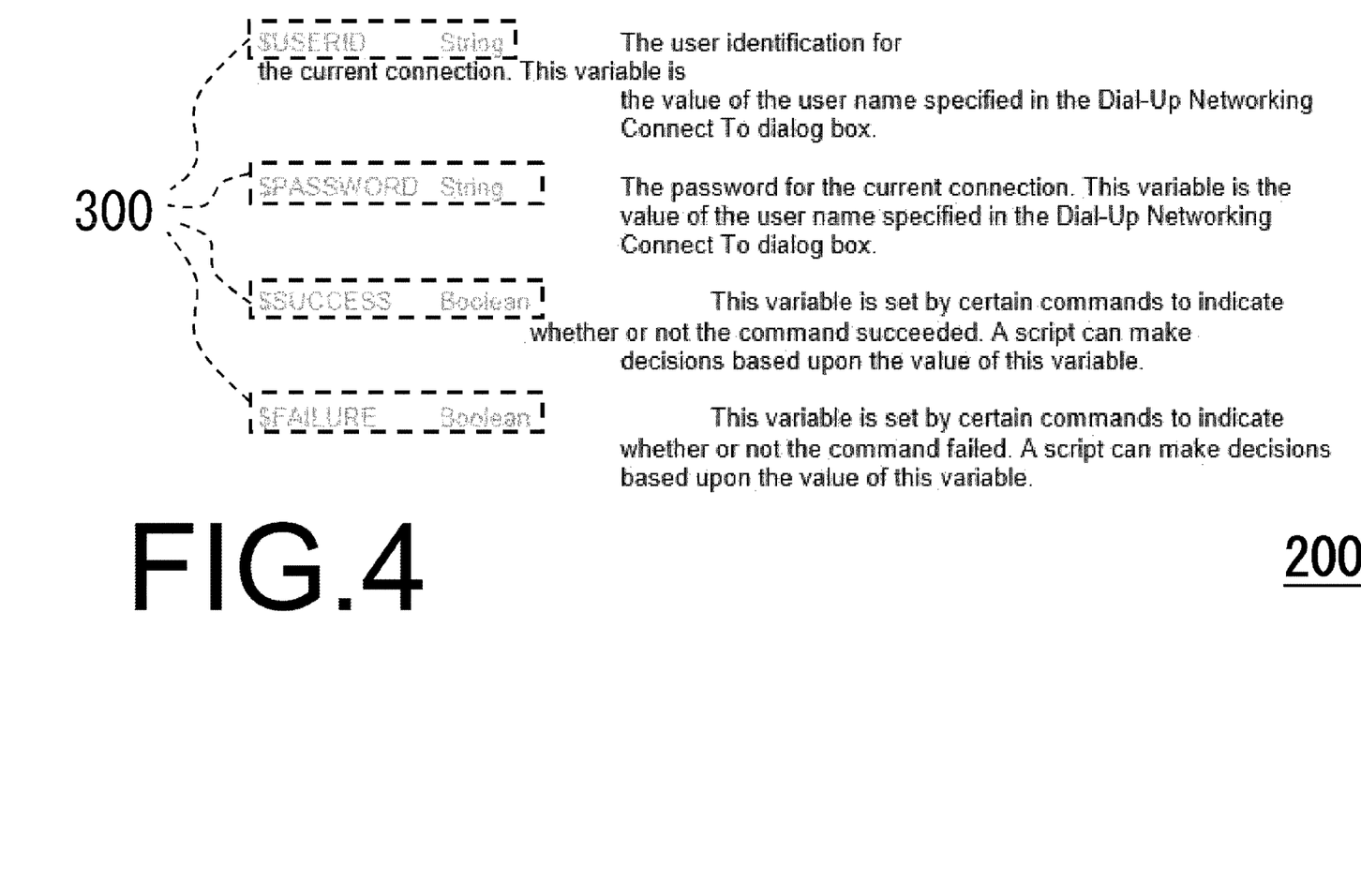
FIG. 4 is a conceptual figure of the document data analysis process as shown in FIG. 3.

Explaining with the example of FIG. 4, the monochrome visual determination unit 100 determines that the distinctiveness is low if the document data 200 includes sentences such as "hereinafter, shown in red characters," "targets in red characters," or the like, and if there is a color portion 300 such as a character or a code object with red color after that. That is, the monochrome visual determination unit 100 searches for a specific keyword from the character sequence, and if there is the keyword and then there is a character of the color, it determines that the distinctiveness is low. FIG. 4 shows an example of document data 200 having a color portion 300 of such a red character portion.

Figure 5:
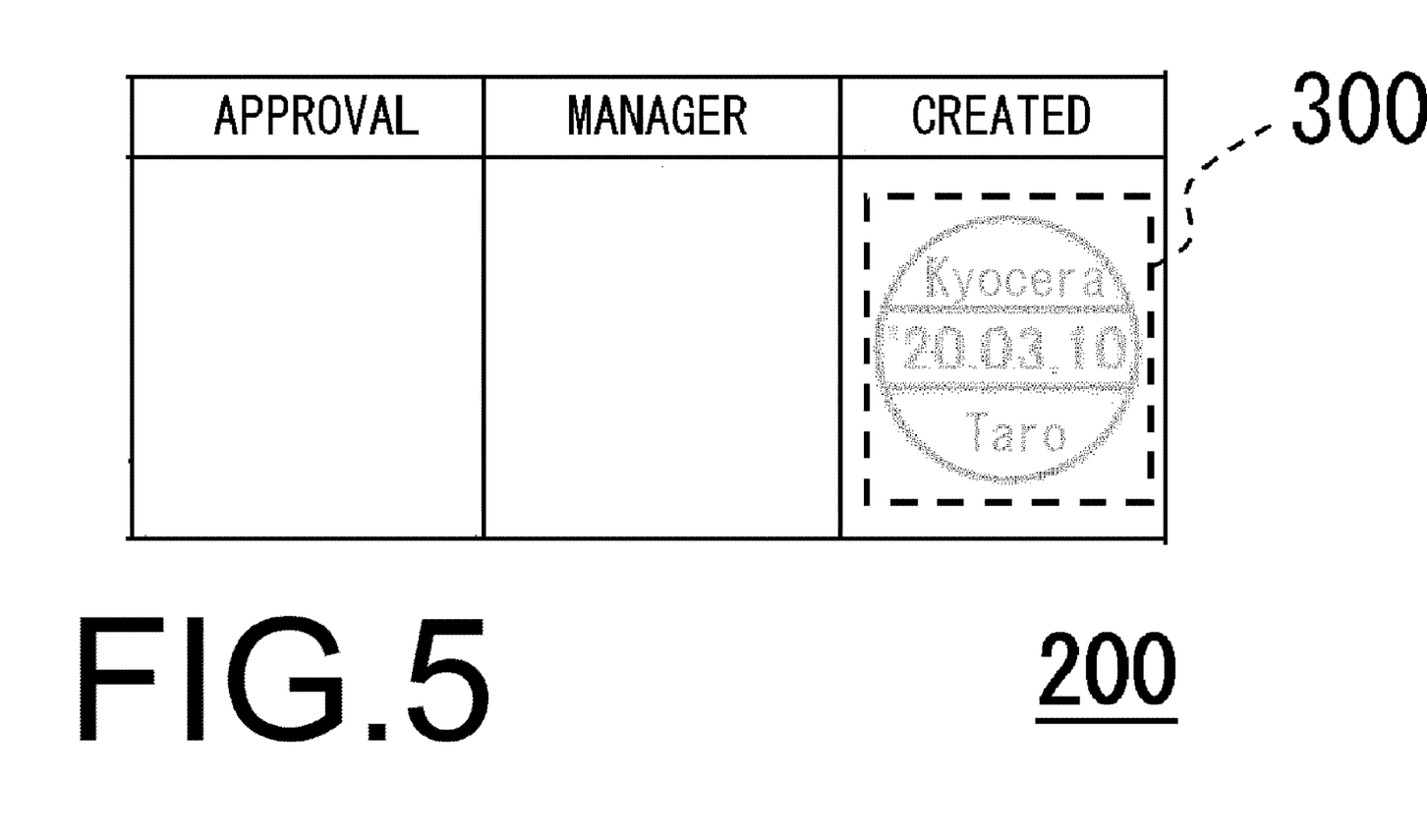
FIG. 5 is a conceptual figure of the document data analysis process as shown in FIG. 3.

Explaining with the example of FIG. 5, the monochrome visual determination unit 100 determines that the distinctiveness is low when the color portion 300 of the electronic mark is present in the document data 200. FIG. 5 shows an example of document data 200 having such a color portion 300 of an electronic stamp.

In addition, the monochrome visual determination unit 100 determines the visual distinctiveness of the object or image data at a portion of a graph. For example, the monochrome visual determination unit 100 determines that the distinctiveness is low when the difference in brightness between the lines, painted areas, or the like, for each color is equal to or less than the monochrome threshold value in monochrome. Further, the monochrome visual determination unit 100 determines the distinctiveness even if the image data is a photograph, or the like. For example, the monochrome visual determination unit 100 determines that the distinctiveness is low even if the ratio of the portions where the difference in brightness is equal to or less than the monochrome threshold if the color portion 300 with red-green color converted to monochrome is equal to or more than the specific ratio.

As described above, the monochrome visual determination unit 100 determines Yes if there is a color portion 300, which the distinctiveness is low, in the document data 200. The monochrome visual determination unit 100 determines No in other cases. In the case of Yes, the monochrome visual determination unit 100 advances the process to step S103. In the case of No, the monochrome visual determination unit 100 advances the process to step S109.

(Step S103)

If there is a color portion 300, which the distinctiveness is low, the monochrome presentation unit 110 performs a warning preview process. The monochrome presentation unit 110 presents by previewing and displaying the state in which the document data 200 is output in monochrome as it is and by warning to the user.

Figure 6:
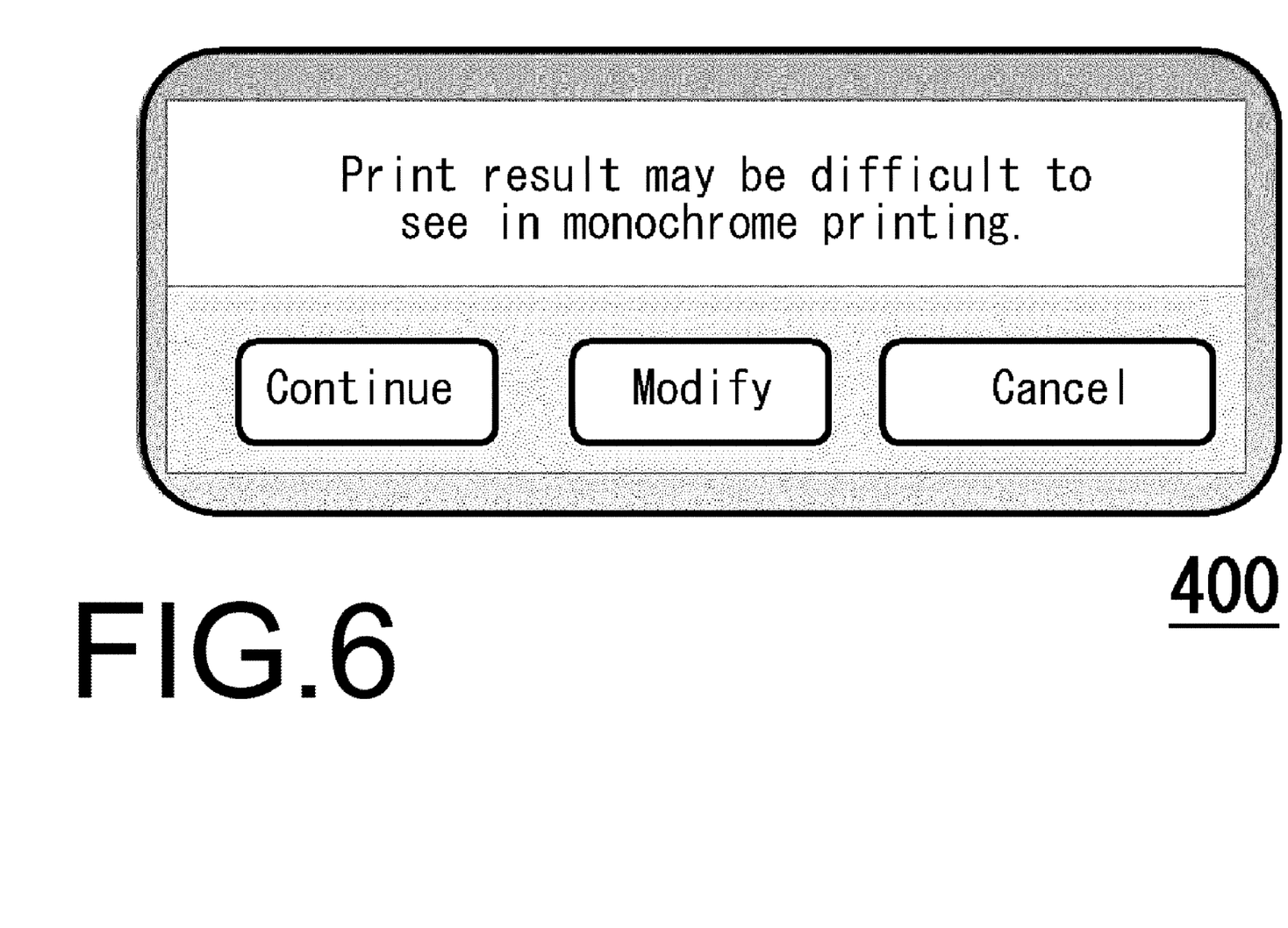
FIG. 6 is an example of a dialog box for selecting whether or not to select the modification as shown in FIG. 3.

Explaining with the example of FIG. 6, the monochrome presentation unit 110 displays a dialog box 400 such as "In monochrome printing, the print result may be difficult to see" on the display unit of the operation panel unit 16. In the dialog box 400, for example, buttons to instruct such as "Continue" to continue the output in the normal monochrome conversion, "Modify" to modify the output of the color portion 300 where the distinctiveness is low, and "Cancel" to cancel the output, are also included. At this time, the monochrome presentation unit 110 generates preview data 210 in a state in which the document data 200 is directly converted into monochrome (hereinafter, referred to as "normal monochrome conversion"). Then, the monochrome presentation unit 110 displays the preview data 210 as a preview screen on the display unit of the operation panel unit 16. This preview screen looks as shown in FIGS. 4 and 5.

(Step S104)

Next, the monochrome presentation unit 110 determines whether or not to cancel printing. In the present embodiment, if the monochrome presentation unit 110 detects that the user has pressed the "Cancel" button in the above-mentioned dialog box 400, it determines Yes. Otherwise, the monochrome presentation unit 110 also determines Yes if the cancel button, or the like, of the operation panel unit 16 is pressed. The monochrome presentation unit 110 determines No in other cases, that is, if the printing is not canceled. In the case of Yes, the monochrome presentation unit 110 ends the monochrome conversion printing process. That is, if canceling, the output of the document data 200 such as printing, or the like, is stopped. After that, the user can also select printing in color, or the like. In the case of No, the monochrome presentation unit 110 advances the process to step S105.

(Step S105)

If the printing is not canceled, the monochrome presentation unit 110 determines whether or not to select the modification. In the present embodiment, if the monochrome presentation unit 110 detects that the "Modify" button is pressed by the user in the above-mentioned dialog box 400, it determines Yes. On the other hand, if the monochrome presentation unit 110 detects that the "Continue" button is pressed, it determines No. In the case of Yes, the monochrome presentation unit 110 advances the process to step S106. In the case of No, the monochrome presentation unit 110 advances the process to step S109.

(Step S106)

If the modification is selected, the monochrome presentation unit 110 and the color modification unit 120 perform a multiple preview selection process. The monochrome presentation unit 110 generates preview data 210 in which the color portion 300 is modified by the color modification unit 120. At this time, the monochrome presentation unit 110 generates preview data 210 when each of a plurality of types of modification is executed in the color modification unit 120. The monochrome presentation unit 110 allows the user to select which type of modification to execute based on the preview display in which the plurality of types of modification has been made.

The screen example 410 of FIG. 7 shows an example in which the preview data 210 that has been processed for each modification of emphasis (bold), underline, and background color is displayed by the color modification unit 120. In addition, in the screen example 410, the preview data 210 when the single color conversion is performed instead of the monochrome conversion is displayed. In this example, the monochrome presentation unit 110 detects the pressing of the arrow key of the input unit of the operation panel unit 16 for each preview data 210 and moves the cursor C to select the type of the modification corresponded to the preview data 210. Further, even in this state, to stop the selection of the modification or to cancel the printing can be instructed.

(Step S107)

Next, the color modification unit 120 performs a document data modifying process. When the user selects the type of modification on the preview screen, the color modification unit 120 executes a process corresponding to the selected modification type for the color portion 300 in which the distinctiveness is low in the document data 200. In the present embodiment, the color modification unit 120 modifies each object and image data of the color portion 300 by processing of emphasis (bold), underline, background color, enlargement, or the like. At this time, the color modification unit 120 may modify each of the color portions 300 in the state of the image data obtained by performing OCR, or the like. Alternatively, the color modification unit 120 may modify the character data obtained by performing OCR and replace the image data of the color portion 300 with the modified character data. Alternatively, the color modification unit 120 may perform a single-color conversion on the color portion 300.

(Step S108)

Next, the monochrome presentation unit 110 performs an after-modification printing process. The monochrome presentation unit 110 converts the document data 200 modified by the color modification unit 120 into monochrome and outputs it. Note that this monochrome conversion includes a single-color conversion. In the present embodiment, after being presented by the monochrome presentation unit 110, the image forming unit 17 forms an image of the document data 200 and outputs it when instructed by the user. As a result, the user can obtain a printing matter similar to the preview data 210 selected on the preview screen. Alternatively, the monochrome presentation unit 110 may facsimile-transmit the document data 200 from the FAX transmitting/receiving unit 18, may convert it into an electronic document such as PDF and send it to an external server or terminal by e-mail, FTP, or the like, or may be also possible to store it in a document box as outputting. Thereafter, the monochrome presentation unit 110 ends the monochrome conversion printing process.

(Step S109)

If there is no color portion 300, which the distinctiveness is low, or no modification is selected, the monochrome presentation unit 110 performs a normal monochrome conversion printing process. The monochrome presentation unit 110 performs normal monochrome conversion on the document data 200, and the image forming unit 17 forms an image and outputs it. Alternatively, as described above, the monochrome presentation unit 110 can output the mono-chrome-converted document data 200 by facsimile transmission, transmission by e-mail or FTP, store it in a document box, or the like. As described above, the monochrome conversion printing process according to the embodiment of the present disclosure is completed.

With the above configuration, the following effects can be obtained. Typically, when attempting to print document data, there have been cases where monochrome conversion is performed for the purpose of reducing the printing cost of the image processing apparatus. However, if simply selecting monochrome printing, the output may end up being visually difficult to understand.

On the other hand, the image forming apparatus 1 according to the present embodiment includes: a monochrome visual determination unit 100 that determines whether or not visual distinctiveness of a color portion 300 is low when document data 200 having the color portion 300 is output in monochrome; and a monochrome presentation unit 110 that presents to a user when there is the color portion 300 that the distinctiveness is determined to be low by the monochrome visual determination unit 100. With this configuration, it can reduce the possibility that the color portion 300 having low visual distinctiveness is printed as it is. That is, the document data 200 can be presented to the user before printing, wasteful output can be reduced, and costs can be reduced. In addition, the user's effort can be reduced and usability can be improved.

On the other hand, unlike the typical technology, the color portion 300, which visibility is not lowered, is not presented, so that the time and effort for the user to confirm can be reduced. Further, since performing weak tone processing, or the like, is not needed on the portions other than the color portions, the visibility of the portions other than the color portions is not lowered.

The image forming apparatus 1 of the present disclosure is that the monochrome presentation unit 110 displays a preview of a state in which the document data 200 is output in monochrome. With this configuration, the preview-display makes it possible to easily determine whether or not monochrome printing should be performed based on the result of printing by a normal monochrome conversion, specifically.

The image forming apparatus 1 of the present disclosure further includes a color modification unit 120 that modify the output of the color portion 300, and the monochrome presentation unit 110 displays a preview of a state in which the color portion 300 is modified by the color modification unit 120. With this configuration, the suggestions for improvement by displaying a preview can be performed, and the user can easily determine whether or not it is better to actually modify and output.

In the image forming apparatus 1 of the present disclosure, the color modification unit 120 is capable to have a plurality of types of modification, monochrome presentation unit 110 is capable to the user to select a type of modification based on a preview display in which the plurality of types of modification is made. With this configuration, the user can easily select the most suitable modification type from the proposals for improvement by displaying a preview of the plurality of modification types.

In the image forming apparatus 1 of the present disclosure, the monochrome visual determination unit 100 determines the distinctiveness is low when the color portion 300 is a character, an electronic mark, a graph, or an image that is difficult to distinguish in monochrome. With this configuration, improving the visibility of objects that are particularly difficult to see when monochrome conversion is performed can be achieved.

Other Embodiments

In the above-described embodiment, an example is described that the document data read by the document reading unit 12 is also used as the document data 200. However, as the document data 200, using only data that can analyze the structure such as PDL data, or the like, is also possible. With this configuration, reliably searching for the color portion 300 and determining the visibility can be achieved. Further, the replacement of the color portion 300 due to an OCR error, or the like, can be suppressed.

In the above-described embodiment, an example of displaying a warning and a preview has been described. However, without performing such a warning or preview display, the type with the highest visibility when each type of modification is made is selected by the AI of the image processing unit 11, and the selected modification may be performed. Alternatively, the user may be presented with a "recommendation" about what kind of modification to be performed as considered with the selection by AI, the history of user's selection, and the like. With this configuration, further improving usability can be attained.

In the above-described embodiment, an example of displaying all the modified preview data 210 side by side has been described. However, it is also possible to let the user select the type of modification on the screen and selectively display the modified preview data 210 according to the selection one by one. Further, each preview display and the color portion 300 may be configured as enlarged or arranged side-by-side for comparison. With such a configuration, making the preview display easier to see according to the environment such as the resolution of the display unit of the operation panel unit 16, or the like, can be achieved.

Further, in the above-described embodiment, an example in which one of various modification is selected in a plurality of preview displays has been described. However, it may be possible to select which type of modification processing is to be performed for each color portion 300, which is low in the distinctiveness, or for each color portion 300 of the same type. As the color portion 300 of the same type, characters of the same color, stamps of the same type, graphs of the same type, and the like, may be selectable. With this configuration, the color portion 300, which visibility is low, can be modified more finely. Therefore, outputting according to the user's intention can be performed.

In the above-described embodiment, an example in which the image forming apparatus 1 is an image processing apparatus has been described. However, an information processing apparatus such as a PC (Personal Computer) or a smartphone may be an image processing apparatus. In this case, for example, a device driver for the image forming apparatus 1 is installed in the information processing apparatus, and monochrome printing, or the like, on the image forming apparatus 1 is selected from various application software or a screen of the device driver. As a result, when the PDL, or the like, is generated by the device driver, the above-mentioned analysis, or the like, is performed to determine whether or not the document data 200 includes the color portion 300 having low visibility. Then, if there is such a color portion 300, displaying the above-mentioned warning and preview on the display unit of the information processing apparatus via the device driver can be performed.

With such a configuration, when printing, or the like, is performed from the information processing apparatus, warning if the visibility is low by monochrome printing, or the like, can be performed. Therefore, useless output can be reduced, costs can be reduced, and usability can be improved.

The present disclosure is also applicable to information processing apparatus other than another image forming apparatus. That is, a network scanner, a server in which the scanner is separately connected by USB, or the like, may be used.

Further, it is needless to say that the configuration and operation of the above-described embodiment are examples and can be appropriately modified and executed without departing from the aim of the present disclosure.

What is claimed is:

1. An image processing apparatus comprising:
a monochrome visual determination unit configured to determine whether or not visual distinctiveness of a color portion is low when document data having the color portion is output in monochrome; and
a monochrome presentation unit configured to present to a user when there is the color portion that the distinctiveness is determined to be low by the monochrome visual determination unit; wherein
the monochrome visual determination unit searches a character sequence of the document data for a keyword including a color name and determines that the visual distinctiveness is low when it is determined that both a) the character sequence has the keyword including the color name and b) the color portion includes a color corresponding to the color name.

2. The image processing apparatus according to claim 1, wherein
the monochrome presentation unit displays a preview of a state in which the document data is output in monochrome.

3. The image processing apparatus according to claim 2, further comprising a color modification unit configured to modify the output of the color portion; wherein
the monochrome presentation unit displays a preview of a state in which the color portion is modified by the color modification unit.

4. The image processing apparatus according to claim 3, wherein
the color modification unit allows to have a plurality of types of modification, and
the monochrome presentation unit allows the user to select a type of modification based on a preview display in which the plurality of types of modification is made.

5. The image processing apparatus according to claim 1, wherein
the color portion is a character, an electronic mark, a graph, or an image.

6. An image forming apparatus comprising:
a monochrome visual determination unit configured to determine whether or not visual distinctiveness of a color portion is low when document data having the color portion is output in monochrome;
a monochrome presentation unit configured to present to a user when there is the color portion that the distinctiveness is determined to be low by the monochrome visual determination unit; and
an image forming unit configured to output the document data when presented by the monochrome presentation unit and instructed by the user; wherein
the monochrome visual determination unit searches a character sequence of the document data for a keyword including a color name and determines that the visual distinctiveness is low when it is determined that both a) the character sequence has the keyword including the color name and b) the color portion includes a color corresponding to the color name.

7. The image forming apparatus according to claim 6, wherein
the monochrome presentation unit displays a preview of a state in which the document data is output in monochrome.

8. The image forming apparatus according to claim 7, further comprising a color modification unit configured to modify the output of the color portion; wherein
the monochrome presentation unit displays a preview of a state in which the color portion is modified by the color modification unit.

9. The image forming apparatus according to claim 8, wherein
the color modification unit allows to have a plurality of types of modification, and
the monochrome presentation unit allows the user to select a type of modification based on a preview display in which the plurality of types of modification is made.

10. The image forming apparatus according to claim 6, wherein
the color portion is a character, an electronic mark, a graph, or an image.

11. An image processing method executed by an image processing apparatus, comprising the steps of:
determining whether or not visual distinctiveness of a color portion is low when document data having the color portion is output in monochrome; and
presenting to a user when there is the color portion that the distinctiveness of the color portion is determined to be low, wherein
the step of determining whether or not visual distinctiveness of a color portion is low comprises:
searching a character sequence of the document data for a keyword including a color name; and
determining that the visual distinctiveness is low when it is determined that both a) the character sequence has the keyword including the color name and b) the color portion includes a color corresponding to the color name.

12. The image processing method according to claim 11, further comprising a step of:
displaying a preview of a state in which the document data is output in monochrome.

13. The image processing method according to claim 12, further comprising the steps of:
modifying the output of the color portion, and
displaying a preview of a state in which the color portion is modified.

14. The image processing method according to claim 13, further comprising the steps of:
allowing to have a plurality of types of modification, and
allowing the user to select a type of modification based on a preview display in which the plurality of types of modification is made.

15. The image processing method according to claim 11, wherein
the color portion is a character, an electronic mark, a graph, or an image.

16. The image processing method according to claim 11, wherein the step of determination that the visual distinctiveness is low comprises determining that the visual distinctiveness is low by determining the character sequence has the keyword including the color name and then there is the color portion including a color corresponding to the color name.

17. The image processing method according to claim 16, wherein the color portion is a character or a code object.

18. The image processing apparatus according to claim 1, wherein the monochrome visual determination unit determines that the visual distinctiveness is low by determining the character sequence has the keyword including the color name and then there is the color portion including a color corresponding to the color name.

19. The image processing apparatus according to claim 18, wherein the color portion is a character or a code object.

20. The image forming apparatus according to claim 6, wherein the monochrome visual determination unit determines that the visual distinctiveness is low by determining the character sequence has the keyword including the color name and then there is the color portion including a color corresponding to the color name.

* * * * *